United States Patent [19]

Ward et al.

[11] 4,455,520

[45] Jun. 19, 1984

[54] METHOD AND MEANS FOR STABLE OPERATION OF A SYNCHRONOUS MOTOR

[75] Inventors: Kenneth C. Ward, Tiburon; Ross Welburn, Santa Rosa, both of Calif.

[73] Assignee: Compumotor Corporation, Petaluma, Calif.

[21] Appl. No.: 268,281

[22] Filed: May 29, 1981

[51] Int. Cl.³ .............................................. H02K 29/02
[52] U.S. Cl. ..................................... 318/696; 318/685
[58] Field of Search ................................ 318/696, 685

[56] References Cited

PUBLICATIONS

Russell et al., "Development of a Stabilization Scheme for the Suppression of Parametric Instability in Stepping Motors", Proc. IEE, vol. 126, No. 4, Apr. 1979, pp. 298–306.

*Primary Examiner*—J. V. Truhe
*Assistant Examiner*—Saul M. Bergmann
*Attorney, Agent, or Firm*—Flehr, Hohbach, Test, Albritton & Herbert

[57] ABSTRACT

Stability in operating a synchronous stepping motor in mid-frequency is achieved by monitoring instantaneous power to the motor and adjusting the phase of the motor drive waveform as needed to maintain uniform speed. In an embodiment in which a pulse width modulator responds to a reference signal waveform, the phase of the reference signal waveform is varied to adjust the instantaneous power delivered to the motor.

8 Claims, 6 Drawing Figures

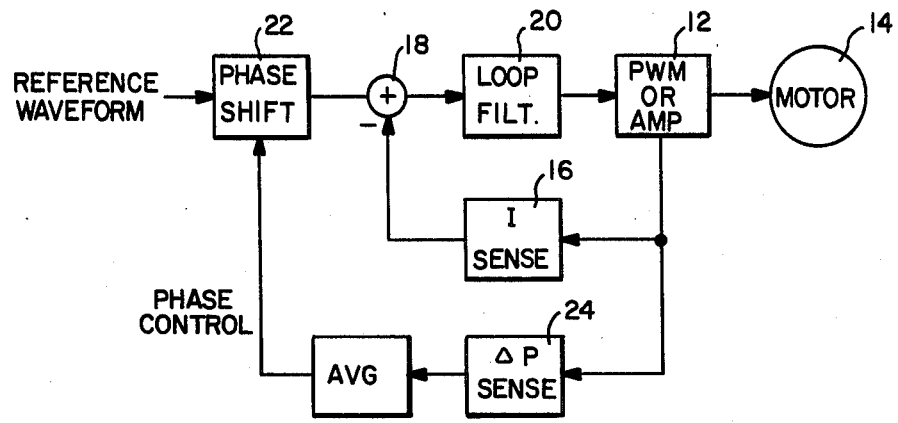
FIG.—1
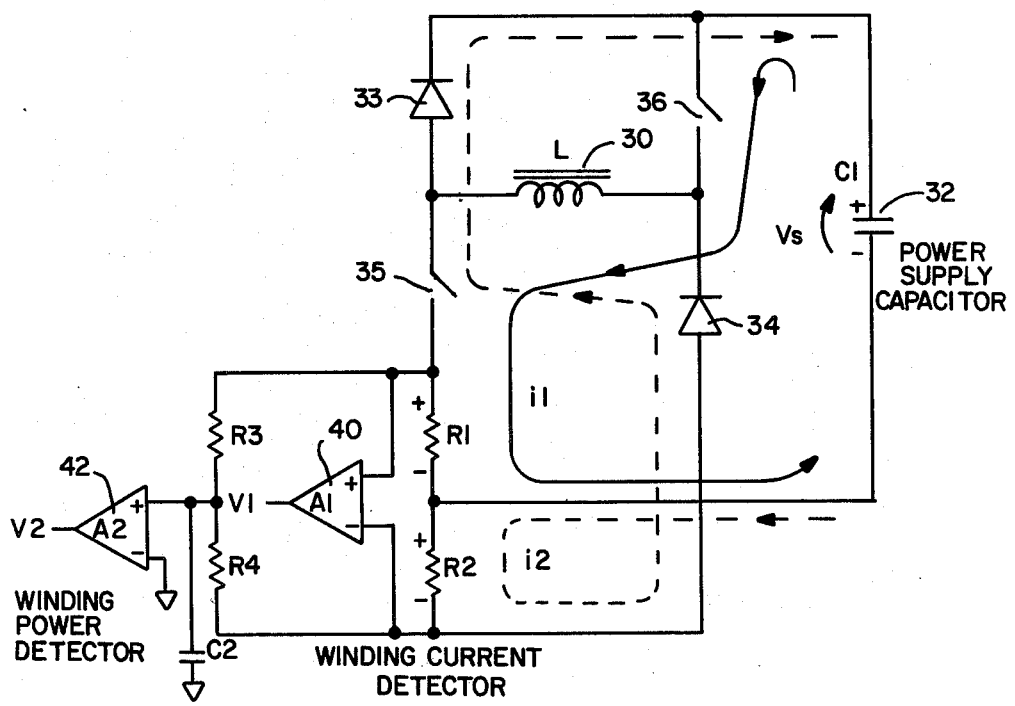
FIG.—2

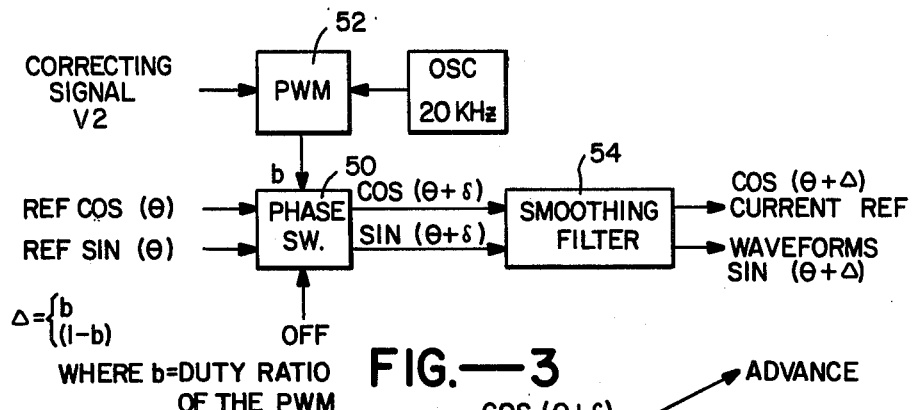
FIG.—3
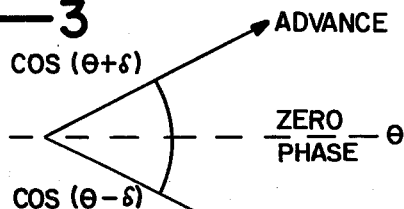
FIG.—4
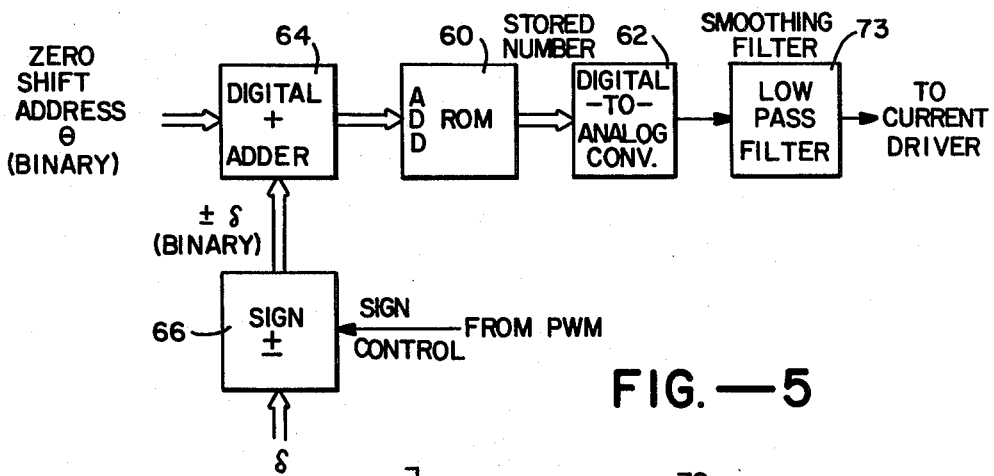
FIG.—5
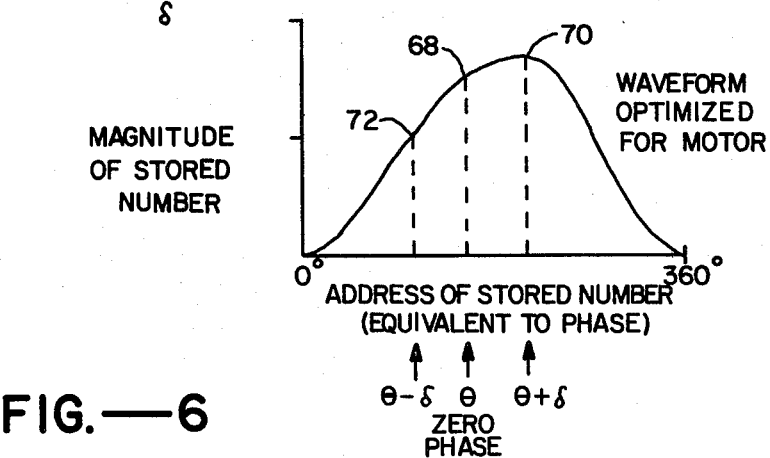
FIG.—6

METHOD AND MEANS FOR STABLE OPERATION OF A SYNCHRONOUS MOTOR

This invention relates generally to drive circuitry for electric motors, and more particularly the invention relates to drive circuitry for synchronous motors.

Synchronous stepping motors are used for position control and variable speed applications due to the reliability and cost effectiveness of the motors and the control systems therefor. Such motors have a rotational speed which is dependent on frequency of the driving voltage and a torque which is dependent on the magnitude of the motor winding current.

A problem encountered with stepping motors is a mid-frequency resonance or parametric oscillation in driving the motors. In this unstable range of operation the motor experiences a velocity modulation which can become sufficiently large to cause loss of stability and synchronization.

Control of parametric resonance by waveform detection has been proposed by Leenhouts and Singh, "An Active Stabilization Technique for Open Loop Permanent Magnet Step Motor Drive Systems," Proceedings, Sixth Annual Symposium Incremental Motion Control Systems and Devices, Kuo, Editor, Department of Electrical Engineering, University of Illinois, Urbana, Ill., 1977. In this technique a damping circuit diode current is sensed and a control quantity derived therefrom is applied as a control voltage to a voltage control oscillator. Minor, "A Circuit for Controlling Mid-Frequency Resonance in Permanent Magnet step Motors," Proceedings, Ninth Annual Symposium Incremental Motion Control Systems and Devices, Kuo, Editor, Incremental Motion Control Systems Society, Champagne, Ill., 1980, teaches a similar technique in which a generated control voltage is applied to a pulse width modulator. Pritchard, "Another Cure for Mid-Frequency Resonance," Proceedings, Eighth Annual Symposium Incremental Motion Control System Devices, Kuo, Editor, Incremental Motion Control System Society, Champagne, Ill., 1979, discloses another technique for use in full step or microstep motors in which a delay or sloped waveform is employed to combat mid-frequency resonance.

Other techniques have been proposed which require velocity or position feedback. However, the motor is often located a considerable distance from the motor driver, and the feedback wiring can be a detriment to performance and reliability.

Accordingly, an object of the present invention is an improved method of controlling parametric oscillations in synchronous motors.

Another object of the invention is drive circuitry for stepping motors which controls mid-frequency operating resonance.

A feature of the invention is circuitry for monitoring motor power and phase modulating winding current to counteract mid-frequency resonance.

Briefly, the method of driving a synchronous motor and avoiding parametric resonance comprises the steps of applying a modulated current to the windings of a motor, monitoring power to the motor, and varying the phase of the modulated current to offset changes in power. As a motor slows down the motor acts as a generator and the total power applied to the motor is reduced. Accordingly, by increasing the phase of a reference current waveform additional power is applied to the motor to increase the speed thereof. Conversely, when the motor increases in speed, additional power is required, and the phase of a reference current waveform is decreased to thereby decrease power to the motor and reduce the motor speed.

In a preferred embodiment the drive circuitry for a synchronous motor comprises means for generating a reference current waveform, a pulse width modulator for receiving the reference current waveform and generating a motor winding current, and means for applying the field winding current to a motor. Monitoring means is provided for monitoring power applied to the motor, and means responsive to the monitoring means varies the phase of the reference current waveform to thereby increase or decrease the phase of the reference waveform as required to decrease or increase the instantaneous power applied to the motor.

The invention and objects and features thereof will be more readily understood from the following detailed description and appended claims when taken with the drawing, in which:

FIG. 1 is a functional block diagram of one embodiment of drive circuitry in accordance with the present invention.

FIG. 2 is an electrical schematic of circuitry for driving a motor winding and including circuitry for detecting winding current and winding power.

FIG. 3 is a schematic of phase shift circuitry of the block diagram of FIG. 1.

FIG. 4 is an illustration of phase advance and retard with the circuitry of FIG. 3.

FIG. 5 is a functional block diagram of phase modulation circuitry for digitally stored waveform.

FIG. 6 is a plot illustrating phase relationships in a digitally constructed waveform.

Referring now to the drawings, FIG. 1 is a functional block diagram of drive circuitry for a synchronous motor in accordance with one embodiment of the invention. As in conventional drive circuitry, a reference waveform is applied to a pulse width modulator 12 or linear amplifier which generates a current for driving a motor 14 with the current corresponding to the reference waveform. Current sense means 16 is provided to control the magnitude of the current with the magnitude from the current sense 16 being subtracted from the reference waveform at 18 and with a loop filter 20 smoothing out the combined waveform and controlling the pulse width modulator 12.

When the motor 14 is running at a constant stable speed, the power to the motor should remain constant. However, when the motor decelerates the power to the motor decreases due to the power generation effects of the motor. Conversely, when the motor increases in speed the instantaneous power to the motor increases to compensate for the increased speed. In accordance with the invention instantaneous power to the motor is monitored and the reference waveform is shifted in phase by the phase shifter 22 in response to the power sensing circuitry 24. Thus, as the motor speed increases the reference waveform is decreased in phase by the phase shift 22, and when the motor speed decreases the reference waveform is increased in phase by the phase shift 22.

FIG. 2 is a schematic of the pulse-width modulator drive circuitry for a motor winding 30 and including circuitry in accordance with one embodiment of the invention for detecting load current and detecting load power. Conventionally, the winding 30 is driven by a bridge switch circuit including a power supply 32, a pair of diodes 33, 34, and a pair of switches 35 and 36. When the switches 35 and 36 are closed one current path through the motor winding is provided for energizing the winding and when the switches 35 and 36 are open a second current path through diode 33 and 34 is provided, as illustrated. Switching occurs at a high rate compared to the motor excitation waveform. When the switches 35, 36 are closed, current in the winding increases, and when the switches are open the winding current decreases. Switching is done at a rate high enough so that the current change in the winding over one switching cycle is only about 10% of average. The percent on time of the switches controls the average current.

If the motor speed oscillates, the power to the motor will oscillate. Power to the motor can be sensed by taking the difference of power when the switches are closed and the power when the switches are open for each winding and summing the results. Averaging power over many switching cycles eliminates switching signals components and retains the time varying character of the power.

Amplifier 40 is interconnected with resistors R1 and R2 to function as a load current detector and generate a signal $V_1$ representing winding current, as follows:

$$V_1 = A_1(I_1R_1 + I_2R_2)$$

Similarly, amplifier 42 is interconnected with resistors R3 and R4, in parallel with resistors R1 and R2 to generate a signal $V_2$ representing an average power to the winding 30, as follows:

$$V_2 = A_2(\overline{I_1R_1 - I_2R_2}).$$

FIG. 3 is a schematic of one embodiment of a phase shifter 22 of FIG. 1 which responds to the correcting signal $V_2$ generated in the circuitry of FIG. 2. The signal $V_2$ can be used as a correction signal by using it to modulate the phase of the excitation waveform. In this embodiment two reference signals are provided, one at $\cos\theta$ and one at $\sin\theta$. The two reference signals are applied to the phase switch 50 which adjusts the phase of the two reference signals in response to the pulse width modulator 52. Pulse width modulator 52 is driven at 20 kilohertz with the correcting signal $V_2$ applied to vary the duty cycle of the pulse width modulator 52. The reference signals at the output of the phase switch 50 are adjusted in phase to $\cos(\theta \pm \delta)$ and $\sin(\theta \pm \delta)$. The two signals are then applied to two smoothing filters 54 which average the waveforms to any intermediate phase $\Delta$. Then as the current excitation waveforms they are applied to the pulse width modulator 12 of FIG. 1. FIG. 4 illustrates the advance and retard phase shift accomplished by phase switch shift 50 in response to the pulse width modulator 52 for the $\cos\theta$ reference signal.

In an alternative embodiment in which the reference waveform is generated digitally by addressing a Read Only Memory (ROM) which stores magnitudes of the reference wave, the phase shift is accomplished by adjusting (e.g. accelerating or decelerating) the address to the ROM and thereby adjusting the phase of the generated waveform, as illustrated in FIG. 5. The read only memory 60 stores the magnitudes of a wave, and the analog wave is generated by digital to analog converter 62 in response to sequentially addressing the ROM 60. Addresses are generated by an address circuitry 64, and the address circuitry responds to a zero shift address input and a phase shift number $\delta$ applied to the phase shift sign selector 66. Sign selector 66 also receives a sign control signal whereby the phase adjustment signal applied through the address adder 64 can either cause a phase lag or phase lead. The effect of address increment lead and address increment lag is illustrated in the curve of FIG. 6 in which zero phase, $\theta$, would address a magnitude in the ROM 60 having a value measured at 68 on the illustrated waveform; whereas a phase lead $(\theta + \delta)$ would have a magnitude of 70 and a phase lag $(\theta - \delta)$ would have a magnitude of 72. Accordingly, the generated wave will either lead or lag the illustrated waveform by adjusting the address to the read only memory.

By monitoring the instantaneous power delivered to a synchronous motor which is to operate at a constant speed, parametric oscillations can be detected and corrected. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. The method of driving a synchronous motor and avoiding parametric resonance comprising the steps of applying a modulated current to the windings of said motor, monitoring power to said motor, and varying the phase of said modulated current to offset changes in power.

2. The method of driving a synchronous motor and controlling operation stability thereof comprising the steps of monitoring power to said motor, increasing current phase and thereby increasing motor speed when the monitored power decreases current, and decreasing phase and thereby decreasing motor speed when monitored power increases.

3. The method of driving a synchronous motor as defined by claim 2 wherein said steps of decreasing and increasing current phase includes varying the phase of a reference signal applied to a pulse width modulator.

4. Apparatus for stably driving a synchronous motor comprising
   means for applying current to a winding of said motor,
   means for detecting power to said motor,
   means for increasing the phase of current to said winding when detected power decreases, and
   means for decreasing the phase of current to said winding when detected power increases.

5. Apparatus as defined by claim 4 wherein said means for increasing phase and for decreasing phase comprises means for adjusting phase of a control signal for a pulse width modulator.

6. Drive circuitry for a synchronous motor comprising
   means for generating a reference signal waveform,
   a pulse width modulator for receiving said reference signal waveform and generating a motor winding current,
   means for applying said winding current to said motor,
   monitoring means for monitoring power applied to said motor, and
   means responsive to said monitoring means for varying the phase of said reference signal waveform.

7. Drive circuitry as defined by claim 6 wherein said means responsive to said monitoring means comprises phase shift circuitry for receiving said reference signal waveform and shifting the phase thereof.

8. Drive circuitry as defined by claim 6 wherein said means responsive to said monitoring means comprises means for altering the address supplied to a read only memory in which the magnitude of a reference signal waveform is stored.

* * * * *